United States Patent Office 3,026,341
Patented Mar. 20, 1962

3,026,341
PROCESS FOR THE HYDROGENATION
OF PHOSPHATIDES
Paul F. Davis, Addison, Ill., assignor to Central Soya Company, Inc., Fort Wayne, Ind., a corporation of Indiana
No Drawing. Filed Dec. 21, 1959, Ser. No. 860,647
20 Claims. (Cl. 260—403)

This invention relates to a process for the hydrogenation of phosphatides and, more particularly, to such a procedure when it employs a catalyst such as a member of the platinum group.

The phosphatides with which this invention is concerned are available commercially from vegetable sources and are commonly referred to as "lecithins." It is in this sense that the term "lecithin" is used hereinafter, rather than in its restrictive scientific meaning, phosphatidycholine.

Hydrogenated lecithins have been available for a long period, but throughout this history, an ever-present problem has been that of green coloring of the hydrogenated lecithin. This coloring has effectively prevented the use of hydrogenated lecithins in foodstuffs which otherwise might have been one of their principal uses.

Notwithstanding the extensive work that has been done on the catalytic hydrogenation of lecithins, this problem has persisted, especially relative to the preferred hydrogenation procedure using platinum group catalysts. Recently, G. Jacini, in a publication (Olii Minerali, Grassi e Saponi, Colori e Vernici, 32 101 (1955)) and a patent (U.S. Patent No. 2,870,179) has explored the use of platinum and advocated its use with nickel as a hydrogenation catalyst for lecithin. The Jacini publication serves as an excellent reference to differentiate the present invention from what has gone before. Jacini found that a green color is formed during hydrogenation of lecithin using platinum as a catalyst, and the lecithin was not substantially lowered in unsaturation. In substantiation of Jacini's results, I have found that use of platinum group metals for hydrogenation of lecithin using the above procedures gives hydrogenated lecithin having a green color. The present invention is differentiated from the past work by the fact that no green color is formed during hydrogenation of the lecithin. Thus, the hydrogenated lecithin is acceptable as an edible emulsifier for use in food products. Further, more substantial conversion of the uncolored phosphatide is possible than was available previously.

The fact that this green coloring has been tolerated for a long time is manifest from the early recognition of the valuable properties of platinum group metals as catalysts for the low temperature hydrogenation of lecithin. See, for example, J. D. Riedel in German Patents Nos. 256,998 (1911); 279,200 (1914), 280,695 (1914; 389,298 (1920); 389,299 (1922); and a Swiss patent No. 73,861 (1916). These patents disclosed the use of platinum group metals as hydrogenation catalysts for lecithin using polar and non-polar solvents. C. Paal and H. Oehme (Ber., 42, 2, 1297 (1913); C. A., 7, 2569 (1913)) described the use of palladium to hydrogenate lecithin in alcoholic solution.

Levene and co-workers (J. Biol. Chem. 33 111 (1918); J. Biol. Chem., 46, 353 (1921); J. Biol. Chem. 68 285 (1926)) hydrogenated lecithin from various sources using platinum and palladium in alcoholic solution containing acetic acid.

A principal object of this invention is to provide an improved procedure for the hydrogenation of phosphatides, i.e., lecithins, which departs from the prior art in avoiding objectionable green coloring.

Another object is to provide a hydrogenated lecithin prepared catalytically through the use of platinum group catalysts wherein there is no objectionable green coloring, it being believed that the green coloring is a result of lecithin contamination by the catalyst.

Still another object is to provide hydrogenated phosphatides having a lighter color, greater resistance to oxidative rancidity, and less odor and flavor than the phosphatides used as the base stock for hydrogenation.

Yet another object is to provide hydrogenated phosphatides which, by virtue of their lower content of unsaturated fatty acids, will be useful in applications where normal phosphatides and know modifications are not used, or are used only to a limited extent.

In one embodiment of the invention, I employ a hydrogenated catalyst to hydrogenate the phosphatide. A wide variety of phosphatide materials can be catalytically hydrogenated according to the invention. However, commercial soybean lecithin is the preferred stock for hydrogenation. This lecithin may be used as it is removed from soybean oil containing about 60-75% of material insoluble in acetone (AI), the acetone-soluble material consisting primarily of soybean oil. Alternately, the base stock may be oil-free phosphatides prepared by removing soybean oil from natural soy lecithin by use of appropriate solvent, such as acetone. The oil-free phosphatides may be extracted with alcohol to give alcohol-soluble and alcohol-insoluble phosphatide fractions which may serve as base stocks for hydrogenation. The phosphatide compositions may be bleached before hydrogenation or after, with oxidizing agents such as hydrogen peroxide to lighten the color. Such bleaching is preferably done before hydrogenation so that resulting peroxides are destroyed, giving a light hydrogenated product with no peroxide content.

While phosphatide materials from soybeans are the preferred base stock for hydrogenation, phosphatides from other sources can be hydrogenated using the inventive procedure. In this connection, the invention may be used to advantage in preparing hydrogenated lecithins prepared from such phosphatide sources as peanuts and corn.

In the practice of the invention, the first step involves the preparation of a catalyst which will have activity at temperatures low enough so that no decomposition of the lecithin will take place during the reaction. Also, the catalyst permits the use of advantageously low pressures during the reaction. Such active catalysts are prepared from such platinum group metals as palladium, platinum or rhodium. Each of these is found in group VIII of the periodic table. The catalysts are desirably dispersed on a carrier for ease of recovery. Commercial preparations dispersed on a variety of carriers (carbon, alumina, calcium carbonate and diatomaceous earth) have been used and found satisfactory using the inventive procedure.

These commercial catalysts have been reduced during prior processing and the catalyst is in the metallic form. I have discovered that these commercial catalyst preparations, when further treated with hydrogen, before use as a catalyst for hydrogenation of lecithin, are singularly effective to prevent green color formation.

I believe that such treatment of the catalyst with hydrogen converts the metal into the hydride, the hydride not reacting with the acidic groups of the lecithin to form a green color.

The reaction of hydrogen with palladium, for example, to give a hydride is believed to proceed as follows:

$$2Pd^\circ + H_2 \rightleftharpoons 2PdH$$

From this, I infer that the catalyst used in the inventive procedure is not a platinum group metal, but is a hydride of such a metal; such hydrides not causing green color during hydrogenation of lecithin. I have found that none of the previous investigators have disclosed this knowledge or used this procedure for the hydrogenation of lecithin. These workers have worked with a salt of the metal, a metallic oxide, or the metal itself, for the hydrogenation of lecithin. Such use, without pre-reduction with hydrogen to convert the catalyst into the hydride form before lecithin addition, uniformly results in green color formation during the hydrogenation.

The invention here not only contemplates the elimination of the undesirable green color in hydrogenated lecithin, but also provides a superior quality hydrogenated lecithin. Here, it is to be appreciated that one of the most important uses of hydrogenated lecithin is in foodstuffs where the color is objectionable. Now that the principal problem is overcome, it would be desirable if a lecithin could be provided that is substantially hydrogenated. A measure of the degree of hydrogenation is the reduction in iodine value—more precisely, the iodine value is a measure of fatty acid unsaturation. The degree of unsaturation is dependent upon several variables: (1) catalyst used, (2) concentration of catalyst, (3) hydrogen pressure, (4) time of reaction, (5) temperature of reaction, (6) type of lecithin or lecithin fraction, (7) pre-treatment of lecithin or lecithin fraction, and (8) solvent. These variables are not all independent, and conditions may be chosen so that hydrogenation will take place using concentrations of catalysts of about 0.1%, which is considered to be optimum from an economic standpoint—taking into account conversion time, cost, etc. Thus, if a catalyst consisting of 10% palladium on carbon is used for hydrogenation, about 1% of this combination is employed, so that the ratio of the metal to the phosphatide material is in the range of 0.05–1.0%.

The pre-reduction of catalyst with hydrogen and the continuous contact therewith has been performed at absolute hydrogen pressures as low as five pounds per square inch. Pre-reduction may also be performed at higher pressures—100 p.s.i.g., with a preferred pressure being somewhat lower, 45 p.s.i.g. The catalyst at either pressure caused no green color formation when subsequently used to hydrogenate lecithin. The hydrogen pressure after lecithin addition may also be varied between about 5 p.s.i.a. and several atmospheres, i.e., 45–100 p.s.i., with satisfactory results. I have found that hydrogenation proceeds faster at the higher hydrogen pressures. For commercial use, an absolute pressure of about 15 p.s.i. may be desirable to minimize capital expenditures for equipment.

The type of lecithin used as a base stock for the hydrogenation and its modification will determine to a large extent the time and temperature at which the reaction will be run. For example, the use of one percent of the catalyst consisting of 10% palladium on carbon results in appreciable hydrogenation of unmodified alcohol-soluble soy lecithin fraction at room temperature. Use of the same conditions for hydrogenation of oil-free soy phosphatides, or the alcohol-insoluble fraction of soy phosphatides, results in very limited hydrogen absorption. The alcohol-soluble lecithin is the easiest fraction to hydrogenate, and the alcohol-insoluble fraction the most difficult.

I have also found that lecithin can be treated before hydrogenation to enable more hydrogen to be absorbed by the phosphatide before the catalyst is inactivated. Such pre-treatment of lecithin may be made with either acids or acid anhydrides. When acids are used, it is believed that salts are formed with the nitrogenous bases present in lecithin, inhibiting their subsequent reaction with metal hydride and allowing greater hydrogen absorption than is the case with untreated lecithin. When an acid anhydride is used to treat lecithin before hydrogenation, it is believed that amides are formed by reaction of the acid anhydride with primary amines in the lecithin molecule, thus inhibiting catalyst inactivation. When acids are used to treat lecithin before hydrogenation, enough should be added to lower the aqueous pH (pH of 1% aqueous dispersion of the treated lecithin) to at least 5.0 to obtain maximum protection of the catalyst towards inactivation. After hydrogenation and removal of catalyst, the lecithin may be neutralized with base so that its aqueous pH is not higher than about 8.0. When acetic anhydride is used, for example, to modify lecithin, enough should be added to completely react with the primary amines present. For natural soy lecithin, this is about 3% of acetic anhydride. Also, when acetic anhydride is used, the modified lecithin may be vacuum steam deodorized to remove resultant acetic acid before hydrogenation. Further, the lecithin may be bleached with hydrogen peroxide before or after treatment with acids or acid anhydride.

As an alternative to the use of acids or acid anhydrides for the treatment of lecithin before hydrogenation, the unmodified lecithin or its fractions may be hydrogenated in solvents one constituent of which is an alcohol. The amount of alcohol added should be less than that which causes precipitation of the lecithin from solution under the conditions of hydrogenation. The amount will therefore be governed primarily by the lecithin or lecithin fraction being hydrogenated and the hydrogenation temperature. Thus, using the alcohol-soluble fraction of lecithin, alcohol may desirably function as the sole solvent, or water may be added. When the alcohol-insoluble fraction is hydrogenated, less than about 20% of the total solvent volume should be alcohol.

Conducting the hydrogenation in a solvent yields the following advantages: (1) easier pre-treatment of catalyst with hydrogen; (2) greater fluidity of lecithin; (3) greater ease in agitation to permit contact of hydrogen, catalyst and lecithin; (4) lower temperatures may be used; and (5) catalyst may be removed more readily by filtration.

In general, any solvent or combination of solvents which will dissolve lecithin and not themselves contribution to catalyst inactivation, may be used. In addition, for lecithin products intended for food use, the solvent should be volatile so that it may be removed under vacuum at temperatures not higher than about 95° C. Typical solvents found useful for this purpose are hexane, benzene, cyclohexane, diethyl ether, ethyl acetate, and mixtures of these solvents with more polar ones such as water and alcohols. Chlorinated solvents such as methylene chloride may be used, but in such a case, the acid content (hydrochloric acid), if too high, should be reduced such as by neutralization or purification of the solvent. For this reason, it is preferable to use a solvent which will not decompose to release acid. Although the use of solvents in hydrogenation is preferred for the reasons given above, those lecithin fractions which are fluid at temperatures below about 95–100° C. may be hydrogenated in the absence of solvent.

Lecithin is labile at elevated temperatures, decomposing to give dark pigments, and an odoriferous product. I, therefore, prefer to conduct the hydrogenation at temperatures lower than about 70° C. The optimum range of operating temperatures is from about 25° C. to about 60° C. At these temperatures, the lecithin is not darkened during hydrogenation and the catalyst may be readily removed by filtration after the hydrogenation is completed.

After absorption of the desired volume of hydrogen, the catalyst is removed by filtration. A filter aid, such as diatomaceous earth, may desirably be added to aid the filtration. During the filtration, particularly when larger volumes are to be filtered, the catalyst-containing hydrogenated lecithin solution should be protected from oxygen. If oxygen is not excluded during filtration, the catalyst may become deficient in hydrogen and react with the hydrogenated lecithin, giving a green-colored product, It is particularly desirable to have the catalyst-containing hydrogenated lecithin solution saturated with hydrogen or an inert gas such as nitrogen during filtration, so that no reaction giving a green-colored lecithin will result.

The solvent is removed under reduced pressure at temperatures as high as about 95° C., but preferably at about 80° C. or lower. Bleaching agents, such as hydrogen peroxide, may be added either here or at a previous stage to inhibit darkening or to further lighten the color. Normally, 0.5% to 2.0% of a 35% hydrogen peroxide solution is found useful. After removal of most of the solvent, the product may be vacuum steam deodorized to remove final traces of solvent.

Before deodorization or after, solutions of base may be added to the hydrogenated lecithin to raise the aqueous pH to as high as about 8.0. The pH may be adjusted higher than about 8.0, but decomposition of the lecithin, with resultant amine odors, may occur. Aqueous suspensions of bases having limited water solubility, such as calcium hydroxide, may also be used. After thorough mixing, the water may be removed under vacuum.

Hydrogenated lecithin products having iodine values of less than about 30 prepared by the inventive procedures set up as brittle solids at room temperature (25° C.) and break with a definite snap. Products having an iodine value of less than about 40 may be flaked by processing on chilled rolls from a molten state. Products having an iodine value of less than about 20 may be ground to pass through a 60 mesh screen to give white, free-flowing powders.

The color of the solid hydrogenated lecithin having an iodine value of less than about 40 will be from an off-white to a yellow brown. The color obtained depends primarily upon the processing of the lecithin before hydrogenation. Therefore, the lecithin used for hydrogenation should not have been subjected to high temperatures for extended periods of time, which treatment usually develops brown-colored pigments not removed by hydrogenation. Lecithin darkened by excessive exposure to heat or prepared from poor quality sources may be treated with hydrogen peroxide after hydrogenation, but will result in contamination with peroxides, which for food applications is undesirable. The colors due to natural pigments such as carotenoids, chlorophyll and their degradation products, are apparently completely removed by hydrogenation.

The invention has been investigated relative to a variety of operating conditions and raw materials. Of the raw materials, various phosphatides and phosphatide fractions of natural origin have been employed as hydrogenation base stocks in the practice of the invention. These base stocks are set forth in Table 1 below, which additionally incorporates an analysis by commonly accepted, standardized methods.

The determination of operating conditions, reactants, etc., has been made, which can be seen by reference to the following specific examples illustrating the catalytic hydrogenation of lecithin. A summary of the forty-two following examples can be found on columns 20 et seq. hereof.

Example 1

A suspension of 0.2 g. of 10% palladium-on-carbon catalyst (0.1% palladium based on phosphatide weight) in 1 ml. of water and 30 ml. of benzene was placed in a low pressure hydrogenation vessel and the headspace flushed with nitrogen. Hydrogen was then admitted and reduction carried out for 19 minutes. A drop in hydrogen pressure of 0.9 p.s.i. was noted. A solution of 20 g. of commercial-grade natural soybean lecithin (N5)—Phosphatide 1 in Table 1 above—containing about 65% soybean phosphatides and 35% soybean oil, in 100 ml. of benzene was then added to the vessel and hydrogenation carried out at pressures of 16–30 p.s.i. gauge and 24–26° C. for 130 minutes.

After flushing the headspace of the hydrogenation vessel with nitrogen, filter aid was added and the catalyst separated from the suspension by filtration under nitrogen. The solvent was then removed from the filtered solution under reduced pressure to give a yellow-brown liquid at 70° C. which became a plastic product at room temperature. The iodine value of the product was 67.2.

This example illustrates the difficulty in hydrogenating an untreated natural lecithin under moderate conditions of temperature and pressure. The natural lecithin employed in this example contained about 35% soybean oil. The drop in iodine value on hydrogenation (96.8 to 67.2) would indicate that the oil has been reduced for the most part and the phosphatide portion has not been appreciably altered.

The difficulty experienced in hydrogenating an untreated natural lecithin as shown in Example 1 cannot be overcome by increasing the catalyst concentration, as is apparent from Example 2.

In a comparative experiment, commercial-grade natural soybean lecithin was reduced in the same manner as described above with the exception that the catalyst was not pre-treated with hydrogen. The resulting product, I.V.=70.6, had a green-brown color. The deep color of this reduced product is to be contrasted with the light yellow color of the product described earlier wherein the catalyst was pre-treated with hydrogen.

Example 2

Hydrogenation of 20 g. of natural soybean lecithin (N5) in the presence of 0.6 g. of 10% palladium-on-carbon (0.3% palladium based on lecithin weight), in a fashion similar to that described in Example 1, produced a yellow-brown product fluid at 70° C., plastic at room temperature and having an iodine value of 53.9. This high iodine value again indicates that the phosphatide fraction of the natural soybean lecithin has not been appreciably reduced. As before, the soybean oil fraction is readily hydrogenated under these conditions.

That the conditions of hydrogenation set forth in Ex-

TABLE 1

| Phosphatide | Percent Acetone Insolubles | Percent Moisture | Percent Acetone Soluble | Percent Petr. Ether Insolubles | Acid Value | Iodine Value | pH of Aqueous Disp. |
|---|---|---|---|---|---|---|---|
| 1. Commercial Natural Soybean Lecithin (N-5) | 64.9 | 0.7 | 34.4 | 0.06 | 24.0 | 96.8 | 6.95 |
| 2. Commercial Natural Soybean Lecithin (PUB) | 71.6 | 0.7 | 27.7 | 0.52 | 25.5 | 93.9 | 7.1 |
| 3. Oil-free Soybean Phosphatides (560) | 97.5 | 0.1 | 2.4 | 0.12 | 33.8 | 80.8 | 7.1 |
| 4. Alcohol-soluble fraction of Soybean phosphatides | 77.0 | 0.2 | 21.0 | 0.07 | 27.0 | 96.7 | 5.0 |
| 5. Alcohol-insoluble Fraction of Soybean Phosphatides | 95.2 | 1.0 | 3.8 | 0.42 | 39.4 | 76.0 | 7.2 |
| 6. Peanut Lecithin | 72.0 | 2.3 | 25.7 | 1.51 | 27.3 | 55.3 | 7.05 |
| 7. Corn Lecithin [1] | 54.5 | 1.4 | 44.1 | 0.02 | 30.9 | 89.3 | 4.9 |

[1] Contains 0.15% sulfur.

amples 1 and 2 above are suitable for the hydrogenation of soybean oil is illustrated in the following experiment:

Example 3

A suspension of 0.5 g. of 10% palladium-on-carbon (0.1% palladium based on soybean oil weight) in 30 ml. of benzene was reduced with hydrogen. A solution of 50 g. of soybean oil in 100 ml. of benzene was added and hydrogenation continued at 13–45 p.s.i. gauge and 25–59° C. for 120 minutes. After flushing the vessel with nitrogen, filter aid was added and the catalyst removed by filtration. The product, after removal of solvent, was a light-yellow oil at 80° C. which changed to a white brittle solid at room temperature; iodine value=3.3.

In the following example, a modified procedure was employed in order to hydrogenate the commercial grade natural soybean lecithin (N5—Phosphatide 1 in Table 1 above). In Examples 1 and 2 above, the high iodine value of the hydrogenated product indicated that the phosphatide fraction had not been appreciably reduced—the reduction in iodine value being the result of the reduction of the oil. For this purpose, the lecithin was acetylated with acetic anhydride.

Example 4

A suspension of 0.2 g. of 10% palladium-on-carbon catalyst (0.1% palladium based on phosphatide weight) in 25 ml. of benzene was placed in a low pressure hydrogenation vessel and the headspace flushed with nitrogen. The catalyst was then reduced with hydrogen for 30 minutes.

The lecithin solution was prepared by dissolving 20 g. of natural soybean lecithin (N5) in 100 ml. of benzene and 1.2 ml. of acetic anhydride (6% based on lecithin weight), heating to 81° C. and cooling to 25° C. This acetylated lecithin solution was added to the reduced catalyst under nitrogen and the hydrogenation started. The hydrogenation was carried out at pressures of 4 to 20 p.s.i. gauge and at 25–30° C. for 160 minutes.

After flushing the headspace with nitrogen to remove excess hydrogen, filter aid was added and the catalyst removed by filtering through a pad of filter aid while under a protective nitrogen atmosphere.

The light yellow-brown benzene solution was concentrated under reduced pressure and vacuum stripped to give a fluid reddish-brown liquid at 80° C. which became a yellow waxy solid at 25° C. The iodine value of the product was 40.7.

The foregoing example illustrates the relative ease of hydrogenation of an acetylated soy lecithin. To illustrate the effect of water on the reaction of Example 4 and to effect a direct comparison with Example 1, the following experiment was performed.

Example 5

A suspension of 0.2 g. of 10% palladium-on-carbon catalyst in 2 ml. of distilled water and 25 ml. of benzene in a low pressure hydrogenation vessel was flushed with nitrogen and reduced one minute with hydrogen.

A lecithin solution prepared by the procedure in Example 4 was added under a nitrogen atmosphere. The hydrogenation was carried out at pressures of 5–20 p.s.i. gauge and at 25–28° C. for 130 minutes.

The recovery procedures of Example 4 were carried out to give a yellow-waxy solid at 25° C. having an iodine value of 38.0. It is to be noted that the addition of water to this catalyst before hydrogenation does not cause green color formation during hydrogenation.

Example 6

A catalyst suspension as in Example 5 containing 1 ml. of water was reduced with hydrogen for 2 minutes.

The acetylated lecithin was prepared by treating dry (0.1% water) natural soybean lecithin (N5) with 3% of acetic anhydride at 90–95° C. for 15 minutes, following which the acetic acid was removed under reduced pressure and the acetylated lecithin vacuum steam deodorized. 20 g. of this lecithin was dissolved in 100 ml. of benzene and added under nitrogen to the reduced catalyst.

The hydrogenation was carried out at pressures of 5 to 20 p.s.i. gauge and at 24–26° C. for 150 minutes.

The recovery procedures of Examples 4 were followed to give a yellow-brown waxy solid having an iodine value of 36.6 and a pH of 4.8.

It was noted in the filtration of the products of Examples 4, 5 and 6, that white insoluble material remained on the catalyst, indicating that some hydrogenated lecithin or soybean oil were insolubilized under these operating conditions.

10 g. of the hydrogenated lecithin was treated with a 3% aqueous solution of ammonia, mixed well and the water removed under reduced pressure to give a product (pH=6.6) which was the same color as the original hydrogenated lecithin. No odor of ammonia was left in the product. The reduction in acidity will give a more acceptable product for certain applications, such as for use in an emulsified shortening.

The above experiment was repeated using 3% succinic anhydride in place of acetic anhydride. The results of hydrogenation were substantially the same.

Example 7

A reduced catalyst was prepared as in Example 4, the reduction being carried out for 9 minutes.

An acetylated lecithin was prepared as in Example 6, using 6% of acetic anhydride instead of 3%.

20 g. of the product was dissolved in 100 ml. of benzene and added under nitrogen to the reduced catalyst. The hydrogenation was carried out at pressures of 15–40 p.s.i. and at 25–56° C. for 120 minutes.

After removal of catalyst and solvent as in Example 4, 0.2 ml. of 35% hydrogen peroxide (1% based on lecithin) and 1.0 ml. of water were added and the water was removed under reduced pressure. The product at 25° C. was a light yellow-brown solid having an iodine valve of 30.8. This product could readily be processed into flakes for ease in handling.

In this example where higher temperatures were used, the filtration to remove catalyst was more readily performed. The product of this example was lighter in color than previous examples due to the use of hydrogen peroxide as a bleaching agent. Hydrogen peroxide is normally used by lecithin processors to lighten the product and standardize color between various lots of product.

Example 8

This example illustrates the low iodine values which can be obtained by the prolonged hydrogenation of acetylated lecithin.

A suspension of 0.5 g. of 10% palladium-on-carbon catalyst in 2.5 ml. of distilled water and 25 ml. of benzene in a low pressure hydrogenation vessel was flushed with nitrogen and reduced 10 min. with hydrogen.

Acetylated lecithin was prepared by vacuum drying natural soybean lecithin (N5) to 0.1% moisture, adding 3% of acetic anhydride and mixing at 90° C. for 15 minutes. The resultant acetic acid was not removed. 50 g. of the acetylated lecithin dissolved in 100 ml. of benzene was added under nitrogen to the hydrogen reduced catalyst. The hydrogenation was carried out at 5–50 p.s.i. gauge pressure at 27–60° C. for 267 minutes.

Hydrogenated lecithin was recovered as in Example 4 to give a brittle yellow-brown solid at 25° C. having an iodine value of 14.1, an acid value of 24.8, and a pH of 4.7. This hydrogenated lecithin was ground in a mortar and pestle at 25° C. and passed through a 60 mesh screen to give a white, free-flowing powder.

Example 9

A catalyst suspension as in Example 6 was reduced with hydrogen for 4 minutes.

20 g. of natural soybean lecithin (N5) in 100 ml. of benzene and 0.8 ml. of acetic anhydride was heated at 81° C. for 20 minutes, and after cooling to 25° C., was flushed with nitrogen and added to the reduced catalyst under nitrogen.

The hydrogenation was carried out at pressures of 15–45 p.s.i. at 24–90° C. for 140 minutes. After cooling to 55° C., the headspace was flushed with nitrogen, filter aid added and the catalyst removed by filtering through a pad of filter aid.

The solvent was removed under reduced pressure, 0.5 ml. of water added and the product vacuum dried. Hydrogenated lecithin having an iodine value of 28.0 and a pH of 4.7 was obtained. The brown brittle solid was darker in color than those prepared in previous examples and had a caramelized odor, indicating that the temperature used during hydrogenation was too high. A maximum temperature in the range of 50–60° C. is preferred, as no caramel type odors are produced in the heat-sensitive lecithin at these temperatures.

Example 10

A catalyst suspension as in Example 6 was reduced 3 minutes with hydrogen.

Acetylated, deodorized, bleached lecithin was prepared from commercial natural soybean lecithin (N5) by heating at 80° C. for 30 minutes with 3% of acetic anhydride, vacuum steam deodorizing, adding 2% of 27.5% hydrogen peroxide, and vacuum drying. 20 g. of this lecithin was dissolved in 100 ml. of benzene, and after flushing with nitrogen, was added to the reduced catalyst under nitrogen.

The hydrogenation was carried out at pressures of 15 to 30 p.s.i. gauge at temperatures of 24–57° C. for 120 minutes.

Hydrogenated lecithin was recovered as in Example 9. The light yellow-brown brittle solid at 25° C. had an iodine value of 26.4 and a peroxide value of 0.0. Peroxide bleaching before hydrogenation removes brown pigments and the peroxides are decomposed during hydrogenation, resulting in a light product not contaminated by residual peroxides. Such a product is valuable as an emulsifier for use in food products.

Example 11

A catalyst suspension as in Example 6 was reduced 2 minutes with hydrogen.

20 g. of natural soybean lecithin (C–1 PUB see No. 2 in Table 1) containing 71.6% phosphatides and 27.7% soybean oil was dissolved in 100 ml. of benzene and 0.8 ml. of acetic anhydride and heated at 81° C. for 20 minutes. After cooling to 25° C. and flushing with nitrogen, the solution was added to the reduced catalyst under nitrogen.

The hydrogenation was carried out at pressures of 15 to 35 p.s.i. gauge and at temperatures of 24 to 52° C. for 140 minutes.

Hydrogenated lecithin was recovered as in Example 7, having an iodine value of 24.7 and a pH of 4.7. The yellow-brown viscous liquid at 80° C. became a light yellow brittle solid at room temperature.

This example illustrates that the procedure for hydrogenation may be used on variable base stock natural soybean lecithin. This natural lecithin is high in P.E.I. (petroleum ether insoluble material-proteinaceous) which could lead to early catalyst inactivation but does not in the described procedure.

Example 12

A suspension of 3.0 g. of 10% palladium-on-carbon catalyst and 3.3 g. of calcium carbonate wet with 6.0 ml. of distilled water in 100 ml. of benzene were placed in a 3.0 liter round bottom glass reaction flask. The flask was equipped with 4 ground glass openings and fitted with a stainless steel turbine type agitator powered by an air motor. The flask also had a thermometer, a hydrogen and nitrogen inlet, and a dropping funnel. The reactants were flushed with nitrogen and reduced 30 min. at 0.0 gauge pressure (14.7 p.s.i. absolute) with hydrogen.

A solution of 300 g. of acetylated lecithin in 600 ml. of benzene was prepared by the addition of 3% of acetic anhydride to dry (0.1% water) natural soybean lecithin (N5) at 85° C., mixing for 30 minutes, vacuum drying, bleaching by addition of 1% of 35% hydrogen peroxide, and drying to remove water.

The lecithin solution was slowly added to the reduced catalyst over a 25 minute period. Some carbon dioxide was generated by the reaction of acetic acid and acetylated lecithin with calcium carbonate and was removed by flushing with hydrogen. The temperature was raised from 26 to 40° C. by the exothermic reaction. After 50 minutes, the temperature was increased to and maintained at 52 to 54° C. by heating. The pressure was kept at 0.0 p.s.i. gauge and the reaction run for a total of 290 minutes. While still saturated with hydrogen, the solution was filtered through filter aid under a nitrogen atmosphere to remove catalyst. Solvent was removed under reduced pressure and the product vacuum steam deodorized to remove final traces of solvent.

A light yellow-brown solid was obtained having an iodine value of 23.4, a pH of 5.0 and an acid value of 18.5.

The foregoing example illustrates the feasibility of hydrogenating lecithin at low hydrogen pressures. The inclusion of calcium carbonate in the reaction serves to remove traces of acetic acid and partially neutralizes the phosphatides, resulting in a product having less odor.

When filtration times are extended, as was the case in this example, the catalyst containing hydrogenated lecithin solution should be saturated with hydrogen. If not, the catalyst may become deficient in hydrogen and may react with the lecithin, resulting in a green color being formed.

Example 13

A suspension of 0.1 g. of 10% palladium-on-carbon catalyst (0.05% palladium based on lecithin) in 30 ml. of benzene in a low pressure hydrogenator was flushed with nitrogen and reduced 14 minutes with hydrogen. I have found that dry reductions of catalyst generally are more time consuming than those done in the presence of water.

A lecithin solution consisting of 20 g. of natural soybean lecithin (N5) in 100 ml. of benzene, 1 ml. of glacial acetic acid and 1 ml. of distilled water was prepared; and after flushing with nitrogen, was added to the hydrogen-reduced catalyst.

The hydrogenation was carried out at pressures of 15 to 30 p.s.i. gauge at 24 to 25° C. for 160 minutes.

The recovery of hydrogenated lecithin was performed as in Example 4 to give a yellow plastic product at 25° C. having an iodine value of 61.6.

When compared with Examples 1 and 2, the foregoing example illustrates that lower amounts of catalyst may be used in the presence of an acid to substantially completely hydrogenate the soybean oil of natural lecithin.

Example 14

A catalyst suspension as in Example 6 was flushed with nitrogen and reduced 14 minutes with hydrogen in a low pressure hydrogenation vessel. A drop in hydrogen pressure of 0.8 lb. was observed.

A lecithin solution consisting of 20 g. of natural lecithin (N5) in 100 ml. of benzene and 0.7 ml. of glacial acetic acid was flushed with nitrogen and added under nitrogen to the reduced catalyst.

The hydrogenation was carried out at 15 to 30 p.s.i. gauge and at 25 to 28° C. for 120 minutes.

After flushing the headspace with nitrogen, filter aid was added and the catalyst removed by filtration through a pad of filter aid while under a protective nitrogen atmosphere. The solvent was removed under reduced pressure, 0.5 ml. of water was added and the product vacuum stripped. The yellow-brown viscous fluid at 70° C. became a light yellow-brown waxy solid at 25° C. having an iodine value of 44.4 and a pH of 6.0.

When compared with Examples 1 and 4, the foregoing example illustrates that small amounts of acetic acid may be used to inhibit catalyst inactivation. It is also apparent that the acetic acid is not completely removed by vacuum stripping.

*Example 15*

This example illustrates the use of citric acid to inactivate lecithin groups which otherwise would inactivate the catalyst more readily. If preferred, the lecithin may be pretreated with acid instead of adding acid to the catalyst as was done in this example. The use of either procedure gives hydrogenated lecithin characterized by absence of green color.

A suspension of 0.5 g. of 10% palladium-on-carbon catalyst in 2.5 ml. of 1 M citric acid solution (0.96% citric acid based on lecithin) and 30 ml. of benzene in a low pressure hydrogenator was flushed with nitrogen and reduced 5 minutes with hydrogen. A pressure drop of 0.8 lb. was noted.

A solution of 50 g. of natural commercial soybean lecithin (N5) in 100 ml. of benzene was flushed with nitrogen and added to the reduced catalyst.

The hydrogenation was carried out at 35 to 50 p.s.i. hydrogen gauge pressure at 25 to 54° C. for 150 minutes.

The hydrogenated lecithin was recovered as in Example 14 to give a yellow-brown solid at 25° C. having an iodine value of 28.5, an acid value of 29.4, and a pH of 5.0. The characteristic lecithin odor was completely removed by hydrogenation, a fatty odor being present. The sample was granulated by forcing through a wire mesh at room temperature to give free flowing granules.

*Example 16*

This example illustrates that lactic acid may be used to inactivate lecithin groups which would otherwise inactivate the catalyst.

A suspension of 0.2 g. of 10% palladium-on-carbon catalyst in 3 ml. of 50% lactic acid and 25 ml. of benzene in a low pressure hydrogenator was flushed with nitrogen and reduced 4 minutes in hydrogen.

A solution of 20 g. of natural commercial soybean lecithin (N5) in 100 ml. of benzene was added to the reduced catalyst.

The hydrogenation was carried out at 15 to 30 p.s.i. hydrogen gauge at 24 to 52° C. for 120 minutes.

After flushing with nitrogen, filter aid was added and the catalyst removed by filtration through a pad of filter aid under nuitrogen. 0.2 ml. of 35% hydrogen peroxide was added and the product vacuum dried. The off-white brittle solid at 25° C. had an iodine value of 21,6 and a pH of 3.95.

*Example 17*

A suspension of 0.2 g. of 10% palladium-on-carbon catalyst in 2.0 ml. of tartaric acid solution (0.86 g. tartaric acid, 4.3% based on lecithin) and 25 ml. of benzene in a low pressure hydrogenator was flushed with nitrogen and reduced 3 minutes in hydrogen.

A solution of 20 g. of natural commercial lecithin (N5) in 100 ml. of benzene was added to the reduced catalyst after flushing with nitrogen.

The hydrogenation was carried out at pressures of 14 to 30 p.s.i. gauge at 24 to 57° C. for 150 minutes.

The lecithin was recovered as in Example 16 to give an off-white brittle solid at room temperature having an iodine value of 22.5 and a pH of 3.75. The hydrogenated lecithin prepared using tartaric acid as modifier was characterized as having little odor.

Examples 13 through 17 illustrate the use of organic acids to modify lecithin before or during hydrogenation to inhibit inactivation of the catalyst. The products are characterized by light colors and low odor and flavor.

*Example 18*

A suspension of 0.5 g. of 10% palladium-on-carbon catalyst in 5.0 ml. of 1 N hydrochloric acid and 30 ml. of benzene in a low pressure hydrogenator was flushed with nitrogen and reduced 10 minutes with hydrogen.

A solution of 50 g. of natural commercial soybean lecithin (N5) in 100 ml. of benzene was added to the reduced catalyst under nitrogen.

The hydrogenation was carried out at pressures of 5 to 45 p.s.i. gauge and at 26 to 60° C. for 120 minutes.

Hydrogenated lecithin was recovered as in Example 14 to give a reddish-brown solid at 25° C. having an iodine value of 30.5, a pH of 4.7, and an acid value of 26.8. The normal odor of soy lecithin was discharged by hydrogenation in hydrochloric acid, a fat-like odor being present.

10 g. of the sample was treated with a 10% aqueous solution of sodium bicarbonate to raise the pH to 7.5 and vacuum dried.

This example illustrates the use of a strong mineral acid to promote catalyst activity for lecithin hydrogenation. The odor of this product is very good. Partial neutralization of acidity will give a product more acceptable for use in food products.

*Example 19*

A suspension of 0.5 g. of 10% palladium-on-carbon catalyst in 2.5 ml. of distilled water and 30 ml. of benzene in a low pressure hydrogenator was flushed with nitrogen and reduced five minutes with hydrogen.

A solution of 50 g. of natural commercial soybean lecithin (N5) in 100 ml. of benzene and 0.5 ml. of 85% orthophosphoric acid was flushed with nitrogen and added under nitrogen to the reduced catalyst.

The hydrogenation was carried out at pressures of 17 to 45 p.s.i. gauge and at 25–55° C. for 120 minutes.

Hydrogenated lecithin was recovered as in Example 14 to give reddish-brown fluid lecithin at 80° C. which became a brittle solid at 25° C. having an iodine value of 26.6 and a pH of 4.0. This hydrogenated lecithin had a fat-like odor.

10 g. of the product prepared in this example was neutralized of pH=8.2 with a 5% aqueous suspension of calcium hydroxide and vacuum dried. Neutralization did not darken the color of this hydrogenated lecithin and a product having less flavor resulted. Hydrogenated lecithin low in flavor is useful as an emulsifier in dairy products such as ice cream.

This example illustrates the use of phosphoric acid to modify lecithin before hydrogenation. If desired, the requisite amount of acid may be added to the catalyst. Phosphoric acid is a particularly desirable additive for modifying lecithin before or during hydrogenation.

As a further illustration of the effect of catalyst pretreatment with hydrogen on color formation, the process described in this example was followed with one change— the catalyst was not pre-treated with hydrogen before lecithin addition. The product proved to be grey-green brittle solid having an iodine value of 28.0. With catalyst pre-treatment, the color of the hardened product was tan. It was also observed that acid modification of the lecithin intensified the color formation when no pre-treatment of the catalyst with hydrogen was employed.

*Example 20*

A suspension of 0.2 g. of 10% palladium-on-carbon in 1.0 ml. of 1 M phosphoric acid and 20 ml. of benzene in a low pressure hydrogenator was flushed with nitrogen and reduced 3 minutes with hydrogen.

20 g. of lecithin in solution as in Example 10 was flushed with nitrogen and added under nitrogen to the reduced catalyst. This lecithin contained acetic anhydride.

The hydrogenation was carried out at 12-30 p.s.i. gauge and at 26-53° C. for 145 minutes.

Hydrogenated lecithin was recovered as in Example 16 to give a light yellow viscous solution at 95° C. which became a brittle off-white solid at 25° C. having an iodine value of 21.0 and a pH of 4.15.

This example illustrates the use of a double treatment to modify lecithin before and during hydrogenation, resulting in a low iodine value being obtained. Other combinations may be used, such as the use of an acetylated lecithin in a solvent combination one component of which is an alcohol, to give a light colored hydrogenated lecithin having a low iodine value.

Example 21

A suspension of 0.2 g. of 10% palladium-on-carbon in 1.5 ml. of 20% sulfuric acid and 20 ml. of benzene in a low pressure hydrogenator was flushed with nitrogen and reduced 2 minutes with hydrogen.

A solution of 20 g. of natural lecithin in 100 ml. of benzene was flushed with nitrogen and added under nitrogen to the reduced catalyst.

The hydrogenation was carried out at pressures of 15 to 30 p.s.i. gauge and at 24 to 52° C. for 120 minutes.

Hydrogenated lecithin was recovered as in Example 16, the solid product at 25° C. having a light orange color. The iodine value was 29.0 and the pH was 3.8.

Examples 18 through 21 illustrate that strong mineral acids may be used to modify lecithin before or during hydrogenation so that early catalyst inactivation is avoided. The products are light in color when unbleached lecithin is used as base stock and may be further lightened by treatment with hydrogen peroxide before or after hydrogenation. The odors of the hydrogenated lecithin are excellent, the normal odor of soy lecithin being completely discharged and only a fat-like odor remaining.

Example 22

A suspension of 0.6 g. of 10% palladium-on-carbon catalyst (0.3% palladium based on lecithin) in 20 ml. of benzene and 5 ml. of 95% ethanol in a low pressure hydrogenator was flushed with nitrogen and reduced 5 minutes with hydrogen.

A solution of 20 g. of natural commercial soybean lecithin (N5) in 100 ml. of benzene and 20 ml. of 95% ethanol was flushed with nitrogen and added to the reduced catalyst.

The hydrogenation was carried out at 10 to 45 p.s.i. gauge and at 25 to 29° C. for 76 minutes.

After flushing with nitrogen and the addition of filter aid, the catalyst was removed by filtration through a pad of filter aid under nitrogen. The filtration proceded slowly due to insolubilized lecithin and/or oil in the mixture at room temperature. The solvent was removed at 80 to 85° C. under reduced pressure, 0.5 ml. of water added and the product vacuum dried.

An off-white hydrogenated lecithin (at room temperature) having an iodine value of 29.9 was obtained.

This example, in comparison with Example 2, illustrates the protective action of alcohol on the catalyst when used as a component of a mixed solvent. Lower iodine values may be obtained when the solution is heated during hydrogenation to promote solubility of the hydrogenated lecithin and oil.

When a lower alcohol, such as ethyl alcohol, is employed in place of the acid modification for promoting the extent of hydrogenation, the quantity used reaches solvent proportions. If used at the same concentration as the acid modifiers, the alcohol is ineffective. Ethyl alcohol can be used at levels of about 10-100% of solvent volume depending upon phosphatide solubility in the mixed solvent and temperature. In contrast to this, molar quantities of the acidic fortifiers are effective in the practice of the invention.

Example 23

A suspension of 0.2 g. of 10% palladium-on-carbon catalyst in 20 ml. of benzene in a low pressure hydrogenator was flushed with nitrogen and reduced for 30 minutes with hydrogen.

A solution of 20 g. of natural commercial soybean lecithin (N5) in 80 ml. of benzene and 20 ml. of 95% ethanol was flushed with nitrogen and added to the reduced catalyst under nitrogen.

The hydrogenation was conducted at 13 to 27 p.s.i. gauge hydrogen at 25 to 28° C. for 120 minutes.

Hydrogenated lecithin was recovered as in Example 22 having an iodine value of 54.0. The product at 25° C. was a yellow-brown waxy to plastic product having no solvent odor.

In this example, as in Example 22, insolubilized material made the filtration slow. Further absorption of hydrogen would occur if the reaction mixture was heated to solubilize the reaction products.

Example 24

A suspension of 0.2 g. of 10% palladium-on-carbon catalyst in 20 ml. of commercial hexane in a low pressure hydrogenation vessel was flushed with nitrogen and reduced for 2 minutes with hydrogen.

An acetylated lecithin was prepared by mixing 0.6 ml. of acetic anhydride with 20 g. of natural commercial soybean lecithin (N5) and heating at 90° C. for 25 minutes. After cooling, the acetylated lecithin was dissolved in 100 ml. of hexane, flushed with nitrogen and added to the reduced catalyst.

Hydrogenation was conducted at 20 to 30 p.s.i. hydrogen gauge at 26 to 46° C. for 120 minutes.

Hydrogenated lecithin was recovered as in Example 22. The product was a yellow-brown waxy solid at 25° C. having an iodine value of 45.2. This example illustrates that hexane may be used as a solvent for lecithin during hydrogenation.

Example 25

A suspension of 0.2 g. of 10% palladium-on-carbon catalyst in 2.0 ml. of 2.0 molar phosphoric acid and 20 ml. of ethyl acetate in a low pressure hydrogenation vessel was flushed with nitrogen and reduced 3 minutes with hydrogen.

A solution of 20 g. of natural commercial soybean lecithin (N5) in 100 ml. of ethyl acetate (at 50° C.) was flushed with nitrogen and added to the reduced catalyst.

The hydrogenation was conducted at 15 to 45 p.s.i. hydrogen gauge at 50 to 54° C. for 120 minutes.

After flushing with nitrogen, it was noted that much insoluble phosphatide material had precipitated in the hydrogenation vessel. 100 ml. of benzene was added to solubilize the phosphatides and the catalyst removed by filtration through filter aid under nitrogen. The solvent was removed under reduced pressure at 85 to 90° C. to give a viscous yellow-brown lecithin solution which became a brittle solid at room temperature with an iodine value of 19.8.

This example illustrates that ethyl acetate is a good solvent to employ during hydrogenation of lecithin. However, the insolubilization of hydrogenated phosphatides which occurs may limit its usefulness to mixed solvent system.

Example 26

A suspension of 0.2 g. of 10% palladium-on-carbon in 1.0 ml. of distilled water and 20 ml. of diethyl ether in a low pressure hydrogenator was flushed with nitrogen and reduced for 9 minutes with hydrogen.

A solution consisting of 20 g. of lecithin prepared as in Example 10 (i.e., including acetic anhydride) in 100 ml. of diethyl ether was flushed with nitrogen and added to the reduced catalyst.

The hydrogenation was conducted at 15 to 30 p.s.i. hydrogen gauge pressure and at 24 to 27° C. for 120 minutes.

After flushing with nitrogen, filter aid was added and the catalyst removed by filtration through filter aid under nitrogen. Most of the solvent was removed by atmospheric distillation, 0.5 ml. of water added and the hydrogenated lecithin vacuum dried. The light yellow waxy solid at room temperature had an iodine value of 42.8.

This example shows that diethyl ether is an acceptable solvent for use during hydrogenation of soy lecithin. Further reduction in iodine value may be obtained by hydrogenation at higher temperature.

*Example 27*

For this example, a different carrier for the palladium was employed, calcium carbonate rather than carbon. The 10% palladium-on-carbon employed in the previous examples was obtained from the American Platinum Works, of Newark, N.J., while the palladium-on-calcium carbonate was obtained from Baker and Company, also of Newark, N.J.

A suspension of 0.4 g. of 5% palladium-on-calcium carbonate in 25 ml. of benzene in a low pressure hydrogenator was flushed with nitrogen and reduced 9 minutes with hydrogen. A drop in pressure of 0.3 lb. was observed.

A solution consisting of 20 g. of lecithin prepared as in Eaxmple 10 in 100 ml. of benzene was flushed with nitrogen and added to the reduced catalyst.

The hydrogenation was conducted at 16 to 40 p.s.i. hydrogen gauge at 26 to 55° C. for 180 minutes.

Hydrogenated lecithin was recovered as in Example 22, the product being a yellow-brown plastic to waxy solid at 25° C. having an iodine value of 58.7.

Using palladium on an alkaline carrier, such as calcium carbonate, as catalyst results in lower absorption of hydrogen by the lecithin. These catalysts are more active when a polar solvent, such as water, is included in the solvent mixture. However, use of water with this catalyst results in green color being formed during the hydrogenation; therefore, water should not be added to increase activity with this catalyst.

*Example 28*

A suspension of 0.2 g. of 10% palladium-on-carbon in 1.0 ml. of distilled water and 20 ml. of cyclohexane in a low pressure hydrogenator was flushed with nitrogen and reduced 6 minutes with hydrogen.

A solution consisting of 20 g. of lecithin prepared as in Example 10 in 100 ml. of cyclohexane was flushed with nitrogen and added to the reduced catalyst.

The hydrogenation was conducted at 15 to 30 p.s.i. hydrogen gauge at 24 to 56° C. for 130 minutes.

Hydrogenated lecithin was recovered as in Example 7. The off-white brittle solid at room temperature had an iodine value of 25.6.

This example indicates that cyclohexane is equivalent to benzene as a solvent for use in hydrogenating lecithin.

*Example 29*

A suspension of 0.2 g. of 10% palladium-on-carbon in 20 ml. of methylene chloride in a low pressure hydrogenator was flushed with nitrogen and reduced 16 minutes with hydrogen.

An acetylated lecithin was prepared by heating 20 g. of natural commercial soy lecithin (N5) with 0.6 ml. of acetic anhydride at 90° C. for 15 minutes. After cooling to 25° C., the acetylated lecithin was dissolved in 100 ml. of methylene chloride, flushed with nitrogen and added to the reduced catalyst.

The hydrogenation was conducted at 14 to 30 p.s.i. hydrogen gauge at 25 to 27° C. for 120 minutes.

Hydrogenated lecithin was recovered as in Example 26. The product was a yellow-brown waxy solid at 25° C. having an iodine value of 46.4.

When methylene chloride is used as solvent, it should be low in hydrochloric acid content as addition of excess hydrochloric acid leads to inactivation of the cataylst. Therefore, the amount of hydrochloric acid added should be known and addition of commercial grades of methylene chloride with variable hydrochloric acid content should not be made unless the acid content is known. Subject to these limitations, the use of methylene chloride as solvent for hydrogenation of lecithin is acceptable.

*Example 30*

A suspension of 0.4 g. of 5% palladium-on-alumina catalyst in 25 ml. of benzene in a low pressure hydrogenator was flushed with nitrogen and reduced 40 minutes with hydrogen.

A solution of 20 g. of natural commercial soybean lecithin (N5) in 100 ml. of benzene was flushed with nitrogen and added to the reduced catalyst.

The hydrogenation was conducted at 7 to 20 p.s.i. hydrogen gauge at 24 to 25° C. for 115 minutes.

Hydrogenated lecithin was recovered as in Example 2. The yellow-brown plastic product at 25° C. had an iodine value of 69.0. The same remarks as were made in Example 27 apply for this catalyst; water improves activity of the catalyst but also promotes formation of green color.

This example indicates that palladium-on-alumina is equivalent to palladium-on-carbon as a catalyst for hydrogenating unmodified soy lecithin.

*Example 31*

A suspension of 2.0 g. of 1% palladium-on-Dicalite (diatomaceous earth) catalyst in 25 ml. of benzene in a low pressure hydrogenator was flushed with nitrogen and reduced 30 minutes with hydrogen.

A solution of 20 g. of natural commercial soy lecithin (N5) in 100 ml. of benzene was flushed with nitrogen and added to the reduced catalyst.

The hydrogenation was conducted at 5 to 20 p.s.i. hydrogen gauge at 24–25° C. for 100 minutes.

Hydrogenated lecithin was recovered as in Example 1. The yellow-brown plastic product (at 25° C.) had an iodine value of 66.0.

This example indicates that palladium-on-Dicalite is equivalent to palladium on carbon as a catalyst for hydrogenating unmodified soy lecithin (see Example 1).

*Example 32*

A suspension of 1.0 g. of 5% rhodium-on-alumina catalyst (0.25% rhodium based on lecithin) in 25 ml. of glacial acetic acid in a low pressure hydrogenator was flushed with nitrogen and reduced for 30 minutes with hydrogen. A solution of 20 g. of natural commercial soy lecithin (N5) in 100 ml. of benzene was flushed with nitrogen and added to the reduced catalyst.

The hydrogenation was conducted at pressures of 25–45 p.s.i. hydrogen gauge at 25–29° C. for 6 minutes.

Hydrogenated lecithin was recovered as in Example 2 to give a reddish-brown plastic product "(at 25° C.)" having an iodine value of 70.0.

This example indicates that rhodium may be used as a catalyst for hydrogenating lecithin.

The catalysts in Examples 30–32 were all obtained from Baker and Company, of Newark, New Jersey.

A comparative study of hydrogenation experiments indicated that palladium and platinum catalysts are superior to a rhodium catalyst in the hydrogenation of lecithin. Further, the rhodium catalyst proved better than a ruthenium catalyst, which prompted a rather slow reduction of lecithin. In a series of experiments, several commercial nickel catalysts were examined for their effectiveness in reducing acid-modified natural commercial soy lecithin as described in Example 10. The nickel catalysts were used at a level such that 1% nickel based on lecithin was present during hydrogenation. 20 g. of acetylated lecithin was dissolved in 100 ml. of benzene and added to the nickel catalyst under hydrogen.

After flushing the vessel with nitrogen and hydrogen, the hydrogenation was conducted under conditions as described in the following table. The results of the experiments are also recorded in Table 2.

TABLE 2

| Catalyst | Gauge Pressure (p.s.i.) | Temp., °C. | Time (min.) | $H_2$ Absorbed (lbs.) |
|---|---|---|---|---|
| A | 44–52 | 91–94 | 395 | 3–4 |
| B | 45 | 91–92 | 345 | 0 |
| C | 45–46 | 91 | 330 | 0 |
| D | 41–43 | 87–89 | 480 | 0 |
| E | 40–45 | 86–91 | 230 | 0 |
| F | 46 | 86–87 | 195 | 0 |

Catalyst A—Resistol C, Batch #339, 25.60% Ni; E. F. Drew and Co.
Catalyst B—KE/FII, 27–28% Ni; Kenigswarter/and Ebell.
Catalyst C—Girdler G-15, Sample No. 5559-A; 25.7% Ni; Chemetron Corp.
Catalyst D—Girdler G-53, Sample No. 5560-A; 23% Ni; Chemetron Corp.
Catalyst E—Rufert Catalyst, Sample No. 5498, 25.88% Ni; Harshaw Co.
Catalyst F—Ni 3201F, Sample No. 261-28-1-3, 30% Ni; Harshaw Co.

It is apparent that these commercial nickel catalysts were ineffective under conditions of hydrogenation such as have proven useful for palladium and platinum catalysts. Further, these nickel catalysts are ineffective below about 100 p.s.i.g.

*Example 33*

A suspension of 0.4 g. of 5% platinum-on-carbon catalyst—Mallinckrodt Chemical Works—(0.1% platinum based on lecithin) in 25 ml. of benzene in a low pressure hydrogenator, was flushed with nitrogen and reduced 11 minutes with hydrogen. (A drop in pressure of 3.0 lbs. hydrogen was observed.) A solution of 20 g. of natural commercial soy lecithin (N5) in 100 ml. of benzene was flushed with nitrogen and added to the reduced catalyst. The hydrogenation was conducted at pressures of 17 p.s.i. hydrogen gauge at 24–54° C. for 120 minutes.

Hydrogenated lecithin was recovered as in Example 1 to give a yellow-brown plastic to waxy product (at 25° C.) having an iodine value of 53.3.

This example indicates that platinum-on-carbon is an acceptable catalyst for the hydrogenation of lecithin.

*Example 34*

A suspension of 0.2 g. of 10% palladium-on-carbon catalyst in 25 ml. of benzene in a low pressure hydrogenator was flushed with nitrogen and reduced 4 minutes with hydrogen. A pressure drop of 0.1 lb. hydrogen was observed.

A solution of commercial oil-free soy phosphatides (O.F.P. #560—see No. 3 in Table 1) in 100 ml. of benzene was flushed with nitrogen and added to the reduced catalyst.

The hydrogenation was conducted at pressures of 27–30 p.s.i. hydrogen gauge at 24–25° C. for 120 minutes.

After flushing with nitrogen, filter aid was added and the catalyst was removed by filtration through a pad of filter aid under a nitrogen atmosphere. The solvent was removed at 70–75° C. under reduced pressure to give a hard wax (25° C.) which was granulated by passing through a wire mesh. The product had an iodine value of 73.9.

This example illustrates the difficulty in hydrogenating an unmodified oil-free soy phosphatide. The catalyst is inactivated before the iodine value is appreciably reduced, although no green color is produced in the product when a hydrogen reduced catalyst is used for hydrogenation.

*Example 35*

A suspension of 0.2 g. of 10% palladium-on-carbon catalyst in 25 ml. of benzene in a low pressure hydrogenator was flushed with nitrogen and reduced 5 minutes with hydrogen. A pressure drop of 0.4 lb. hydrogen was observed.

A solution consisting of 20 g. of commercial oil-free soy phosphatides (O.F.P. #560) in 100 ml. of benzene and 1.2 ml of acetic anhydride was heated at 81° C. for 30 minutes. After cooling to 25° C., 1.0 ml. of distilled water was added, the solution flushed with nitrogen and added to the reduced catalyst.

The hydrogenation was conducted at pressures of 15–30 p.s.i. hydrogen gauge at 25–27° C. for 120 minutes.

Hydrogenated lecithin was recovered as in Example 34. The product was a hard yellow-brown wax (at 25° C.) having an iodine value of 33.6.

This example illustrates that modified oil-free soy phosphatides may readily be hydrogenated using the processes of this invention.

*Example 36*

A suspension of 0.2 g. of 10% palladium-on-carbon catalyst in 25 ml. of benzene in a low pressure hydrogenator was flushed with nitrogen and reduced 7 minutes with hydrogen.

A solution of 20 g. of alcohol-soluble soy phosphatides (Phosphatide 4 in Table 1 above) in 100 ml. of benzene and 1.0 ml. of distilled water was flushed with nitrogen and added to the reduced catalyst.

The hydrogenation was conducted at 15–30 p.s.i. hydrogen gauge pressure at 25–27° C. for 120 minutes.

Hydrogenated lecithin was recovered as in Example 34 as a soft yellow waxy solid (at 25° C.) having an iodine value of 48.9.

This example illustrates that unmodified alcohol-soluble soy phosphatides are relatively easy to hydrogenate, perhaps due to the already low natural pH (5.0).

*Example 37*

A suspension of 0.2 g. of 10% palladium-on-carbon catalyst in 25 ml. of benzene in a low pressure hydrogenator was flushed with nitrogen and reduced 5 minutes with hydrogen.

A solution of 20 g. of alcohol-soluble soy phosphatides (as in Example 36) in 100 ml. of benzene and 1.0 ml. of acetic anhydride was heated at 81° C. for 30 minutes. After cooling to 25° C., 1.0 ml. of distilled water was added, the solution flushed with nitrogen and added to the reduced catalyst.

The hydrogenation was conducted at a pressure of 15–30 p.s.i. hydrogen gauge at 25–29° C. for 120 minutes.

Hydrogenated lecithin was recovered as in Example 34 as a hard yellow waxy solid (at 25° C.) having an iodine value of 29.2.

This example, in comparison with Example 36, shows that the anhydride-modified, alcohol-soluble lecithin can be reduced to a greater extent than the unmodified phosphatide.

*Example 38*

A suspension of 0.2 g. of 10% palladium-on-carbon catalyst in 25 ml. of benzene in a low pressure hydrogenator was flushed with nitrogen and reduced 5 minutes with hydrogen.

A solution of 20 g. of alcohol-insoluble soy phosphatides (No. 5 in Table 1) in 100 ml. of benzene was flushed with nitrogen and added to the reduced catalyst.

The hydrogenation was conducted at pressures of 15–30 p.s.i. hydrogen gauge at 25° C. for 120 minutes.

Hydrogenated lecithin was recovered as in Example 34 to give a yellow-brown waxy solid (at 25° C.) which was granulated through a wire mesh to give free-flowing granules. The iodine value of this example was 68.6.

The results of this example indicate that unmodified alcohol-insoluble soy phosphatides are difficult to hydrogenate, although the color of the product is acceptable.

Example 39

A suspension of 0.2 g. of 10% palladium-on-carbon catalyst in 25 ml. of benzene in a low pressure hydrogenator was flushed with nitrogen and reduced 5 minutes with hydrogen.

A solution of 20 g. of alcohol-insoluble soy phosphatides (see Example 38) in 100 ml. of benzene and 0.4 ml. of 35% hydrogen peroxide (2% based on lecithin weight) was heated at 81° C. for 20 minutes, 1.5 ml. of acetic anhydride added and the heating continued for 30 minutes. After cooling to 25° C., the lecithin solution was flushed with nitrogen and added to the reduced catalyst.

The hydrogenation was conducted at pressures of 15–30 p.s.i. hydrogen gauge at 26–29° C. for 120 minutes.

Hydrogenated lecithin was recovered as in Example 34 as a hard waxy solid (at 25° C.) having an iodine value of 33.4.

In comparison with Example 38, the foregoing example illustrates the relative ease with which modified alcohol-insoluble soy phosphatides (as with an anhydride) may be hydrogenated using the inventive process.

Example 40

A suspension of 0.2 g. of 10% palladium-on-carbon catalyst in 20 ml. of benzene in a low pressure hydrogenator was flushed with nitrogen and reduced 3 minutes in hydrogen.

A solution of 20 g. of natural commercial peanut lecithin (No. 6 in Table 1) in 100 ml. of benzene was added to the reduced catalyst while flushing with nitrogen.

The hydrogenation was conducted at pressures of 25–30 p.s.i. hydrogen gauge at 26–53° C. for 120 minutes.

Hydrogenated peanut lecithin was recovered as in Example 22 as a dark brown waxy solid (at 25° C.) having an iodine value of 40.0.

This example illustrates the difficulty in hydrogenating an unmodified peanut lecithin. The color of this lecithin was not appreciably lightened by hydrogenation, as the primary source of color in this lecithin was due to dark brown pigments not destroyed by hydrogenation.

Example 41

A suspension of 0.2 g. of 10% palladium-on-carbon catalyst in 2.0 ml. of 2.0 molar phosphoric acid and 25 ml. of benzene in a low pressure hydrogenator was flushed with nitrogen and reduced 10 minutes with hydrogen.

A solution of 21.0 g. of natural commercial peanut lecithin (see Example 40) in 100 ml. of benzene was filtered through filter aid to remove insoluble material, 1.0 ml. of 35% hydrogen peroxide added and heated with occasional agitation at 80–81° C. for 4 hours. This oxidative bleaching changed the dark brown color to a reddish-brown one. After cooling to 25° C., the solution was flushed with nitrogen and added to the reduced catalyst.

The hydrogenation was conducted at pressures of 21–30 p.s.i. hydrogen gauge at 24–53° C. for 180 minutes.

Hydrogenated lecithin was recovered as in Example 22 as a reddish-brown brittle solid (at 25° C.) having an iodine value of 23.9.

This example illustrates the benefit in hydrogenating a peanut lecithin modified by processes of the present invention.

Example 42

A suspension of 0.1 g. of 10% palladium-on-carbon catalyst in 20 ml. of benzene in a low pressure hydrogenator was flushed with nitrogen and reduced 9 minutes in hydrogen.

A solution of 10 g. of natural corn lecithin (see Table 1, note sulfur content) in 50 ml. of benzene was flushed with nitrogen and added to the reduced catalyst.

The hydrogenation was conducted at pressures of 26–30 p.s.i. hydrogen gauge at 25° C. for 120 minutes.

Hydrogenated lecithin was recovered as in Example 22 as a reddish-brown plastic product (at 25° C.) having an iodine value of 71.9. The low absorption of hydrogen by this sample of corn lecithin may be due to the contained sulfur which poisons the catalyst. As before, beneficiation is possible through the lecithin modification procedure of the invention.

SUMMARY

In summary, the following may be derived from the foregoing examples:

(1) In each case of using a hydrogenated catalyst, there was no appearance of the undesirable green color, this being illustrated by comparing the experiments of Example 1. The succeeding Examples 2–42 also demonstrate the production of a hydrogenated phosphatide characterized by the absence of any developed color—i.e., greenness over and above any tint implicit in the unhydrogenated phosphatide. In most instances, hydrogenation results in color improvement.

(2) The same beneficiation is obtained when other phosphatide materials are employed as the stock for hydrogenation. This is illustrated by Example 11 relative to commercial crude soybean lecithin (PUB—No. 2 in Table 1). The beneficiation of oil-free soybean phosphatides can be appreciated from a comparison of Examples 34 and 35. The improvement in iodine value of the alcohol-soluble fraction of soybean phosphatides is illustrated by the procedures of Examples 36 and 37. In like fashion, the increased saturation achieved through fortifying the alcohol-insoluble fraction of soybean phosphatides and peanut lecithin can be appreciated from comparing Examples 38 and 39, and Examples 40 and 41, respectively.

(3) The addition of an agent such as an acid, alcohol or an anhydride, increased the saturation, i.e., lowered the iodine value. This can be seen most readily relative to commercial crude soybean lecithin modified by an anhydride by comparing Examples 1 and 4. The usage of the alcohol in this connection can be seen from a comparison of Examples 2 and 22. Comparison of Example 1 with Examples 13–17 shows the benefit achieved through the use of organic acid, while a comparison of Example 1 with Examples 18–21 shows the benefit obtained by using inorganic acids. Further, Example 20 illustrates the employment of mixed agents, i.e., phosphoric acid and acetic anhydride. However, the agent addition promotes undesirable color development in the absence of catalyst pre-treatment (see Example 19).

(4) The effect of temperature on the fortified hydrogenation can be appreciated from a comparison of Examples 8 and 9, while the pressure variation is apparent by comparing Example 12 with the remaining examples.

(5) The variation possible in the solid carrier for the catalyst can be seen from Examples 12, 27, 30 and 31. It is thus evident that the procedure has sufficient flexibility for various applications.

(6) Variation in the catalyst metals is illustrated by comparing Examples 32 and 33 with the remaining Examples, the specified examples showing, respectively, rhodium and platinum, while the remaining examples employ palladium as the catalyst metal.

(7) Examples 22–26, 28 and 29 show the compatibility of the inventive process with a wide variety of solvents such as benzene, ethanol, hexane, ethyl acetate, diethyl ether, cyclohexane, and methylene chloride, thus making the procedure acceptable for various industrial uses.

(8) The catalyst concentration based on the phosphatide weight may be varied considerably around the economic optimum of 0.1%, as can be appreciated from a consideration of Examples 1, 2 and 13.

(9) The time of catalyst hydrogenation may also be varied between wide limits, such as the 1 minute of contact in Example 1 to the 40 minutes of contact in Example 30.

Based on the foregoing, I find an advantageous use of the invention for commercial production to include employing a palladium-on-carbon catalyst with benzene and phosphoric acid as the milieu for phosphatide hydrogenation.

Hydrogenated lecithin products prepared from crude soy lecithin and having iodine values of from 14.5 to 30.5 have been tested as the sole emulsifier in the preparation of bakers' type "high ratio" cakes. The lecithin products which are commercially available now are used as mixtures with other emulsifiers for certain types of high ratio cakes, but are not acceptable as a single component emulsifier in this type of work. I have found that the hydrogenated lecithin of the invention may be used as a complete replacement for mono- and diglycerides as the emulsifier in high ratio cakes at at about one-half the concentration of the mono- and diglycerides normally used, to give cakes characterized by higher volumes per unit weight and a more uniform grain structure. Other applications of the inventive hydrogenated vegetable phosphatide materials include various bakery products, prepared cake, cookie and biscuit mixes and ice cream and frozen dessert manufacture, and in pharmaceutical products.

While, in the foregoing specification, I have set forth a detailed description of the invention for the purpose of explanation thereof, many variations in the details herein given may be made by those skilled in the art without departing from the spirit and scope of the invention.

I claim:

1. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material.

2. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said catalyst comprising a platinum-like metal selected from group 8 of the periodic table of elements operative to hydrogenate said material at a hydrogen pressure less than about 100 p.s.i.

3. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said catalyst comprising a member selected from the class consisting of platinum, palladium, and rhodium.

4. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said catalyst being dispersed on a carrier, said carrier being a member selected from the class consisting of carbon, alumina, calcium carbonate and diatomaceous earth.

5. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturtaion of the phosphatide material, the amount of catalyst employed being from about 0.05% to about 1.0% by weight of the phosphatide material, said catalyst being a member selected from the class consisting of platinum and palladium.

6. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said contacts being carried out under conditions of time, temperature, pressure and oxygen absence effective to prevent the development of green color in the hydrogenated phosphatide material.

7. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said hydrogen having a pressure in said contacting steps above about 5 p.s.i. absolute and below about 100 p.s.i. gauge.

8. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, said catalyst being substantially free of contact with an oxidizing agent between the first and second-mentioned contacting steps.

9. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, and wherein one of said catalyst and phosphatide material is fortified by an agent effective to inhibit catalyst inactivation.

10. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, and wherein said phosphatide material is treated with a member selected from the group consisting of an acid, an alcohol, and an anhydride.

11. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, and wherein said phosphatide material is treated with a member selected from the class consisting of ethanol and acetic anhydride.

12. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, the second-mentioned contacting step being carried out at a temperature in the range of about 25–70°.

13. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, the second contacting step being carried out with said phosphatide material in solution, said catalyst, after the second-mentioned contacting step, being removed from said solution in the absence of oxygen.

14. In the catalytic hydrogenation of phosphatide material, the steps of first contacting the catalyst with hydrogen in the absence of said phosphatide material, and thereafter contacting said phosphatide material with hydrogen in the presence of the hydrogen-treated catalyst to promote a decrease in the unsaturation of the phosphatide material, and wherein said phosphatide material is treated with an agent effective to inhibit catalyst inactivation.

15. In a method of catalytically hydrogenating phosphatide material, the steps of suspending a metal catalyst on a carrier in a phosphatide solvent, subjecting the suspension to a hydrogen atmosphere under conditions effective to substantially hydrogenate the metal, and thereafter contacting the said suspension with a phosphatide solution in the absence of oxygen and under conditions of hydrogenation.

16. The method of claim 15 in which the said phosphatide material comprises the phosphatide fraction of natural soybean lecithin and said solution comprises an agent selected from the class consisting of acids, alcohols and acid anhydrides.

17. The method of claim 16 in which the said phosphatide material is substantially oil-free.

18. In a method for catalytically hydrogenating phosphatide materials, the improvement comprising suspending a platinum group metal and solid carrier therefor in a solvent for said phosphatide material, subjecting the suspension to an atmosphere of hydrogen for a period in excess of about one minute, said atmosphere having a pressure in excess of about 5 p.s.i. absolute, and thereafter mixing the said suspension with a phosphatide solution in the presence of a hydrogen atmosphere and while maintaining the temperature of the mixture below about 70° C.

19. The method of claim 18 in which the solvent for said phosphatide material is a member selected from the class consisting of benzene, hexane, cyclohexane, diethyl ether, ethyl acetate, ethanol, and methylene chloride.

20. A process of catalytically hydrogenating phosphatide materials, comprising saturating with hydrogen a carrier-supported catalyst comprising palladium and carbon, and contacting said catalyst and material with hydrogen at a pressure in the range of 5 p.s.i.a. to 100 p.s.i.g. in the presence of phosphoric acid and at a temperature of from about 25°–90° C., the phosphoric acid being present in a quantity sufficient to provide a pH below about 5 in a dilute aqueous solution of the phosphatide material.

References Cited in the file of this patent
UNITED STATES PATENTS

| | | |
|---|---|---|
| 2,609,346 | Faulkner | Sept. 2, 1952 |
| 2,870,179 | Jacini | Jan. 20, 1959 |
| 2,932,658 | Thompson | Apr. 12, 1960 |

OTHER REFERENCES

The Oil and Colour Trades Journal 1663 and 1665, Dec. 9, 1938.

Mitchell: The Chemical Age, 495–98 (May 8, 1943).